United States Patent
Sakaguchi

(10) Patent No.: US 10,941,861 B2
(45) Date of Patent: Mar. 9, 2021

(54) SHIFT RANGE CONTROL APPARATUS

(71) Applicant: DENSO CORPORATION, Kariya (JP)

(72) Inventor: Koji Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/575,462

(22) Filed: Sep. 19, 2019

(65) Prior Publication Data

US 2020/0011414 A1    Jan. 9, 2020

Related U.S. Application Data

(63) Continuation of application No. PCT/JP2018/014839, filed on Apr. 9, 2018.

(30) Foreign Application Priority Data

Apr. 13, 2017 (JP) .............................. JP2017-079595

(51) Int. Cl.
*F16H 61/32* (2006.01)
*H02P 3/18* (2006.01)
*F16H 63/38* (2006.01)

(52) U.S. Cl.
CPC .............. *F16H 61/32* (2013.01); *H02P 3/18* (2013.01); *F16H 63/38* (2013.01); *F16H 2061/326* (2013.01); *F16H 2342/02* (2013.01)

(58) Field of Classification Search
CPC .... F16H 61/32; F16H 63/38; F16H 2061/326; F16H 2342/002; H02P 23/0027
USPC ................................................ 701/59, 60, 64
See application file for complete search history.

(56) References Cited

U.S. PATENT DOCUMENTS

| 7,511,444 B2 | 3/2009 | Nakai et al. | |
| 10,680,542 B2 * | 6/2020 | Kamio | H02P 29/64 |
| 2017/0307073 A1 * | 10/2017 | Yamada | F16H 61/32 |
| 2019/0353242 A1 * | 11/2019 | Kamio | F16H 59/105 |
| 2020/0080635 A1 * | 3/2020 | Kamio | H02P 23/0031 |
| 2020/0325986 A1 * | 10/2020 | Sakaguchi | F16H 61/12 |

FOREIGN PATENT DOCUMENTS

| WO | WO-2019017359 A1 * | 1/2019 | .............. H02P 25/16 |
| WO | WO-2019131331 A1 * | 7/2019 | .............. F16H 61/32 |

* cited by examiner

*Primary Examiner* — Roger L Pang
(74) *Attorney, Agent, or Firm* — Nixon & Vanderhye P.C.

(57) ABSTRACT

A shift range control apparatus is applied to a shift range switching mechanism that includes a rotation member including multiple recesses, and an engagement member that positions the rotation member by engaging to the recesses. The shift range control apparatus controls a motor of a shift actuator connected to the rotation member to switch a shift range. The shift range control apparatus includes a rotation speed detection section that detects an output shaft rotation speed corresponding to a rotation speed of an output shaft of the shift actuator, and a movement determination section that determines that an engagement portion of the engagement member has relatively moved to a bottom of one of the recesses of the rotation member when the output shaft rotation speed is equal to or lower than a predetermined value during switching of the shift range.

4 Claims, 15 Drawing Sheets

SHIFT RANGE CONTROL APPARATUS

CROSS REFERENCE TO RELATED APPLICATION

The present application is a continuation application of International Patent Application No. PCT/JP2018/014839 filed on Apr. 9, 2018, which designated the U.S. and claims the benefit of priority from Japanese Patent Application No. 2017-079595 filed on Apr. 13, 2017. The entire disclosures of all of the above applications are incorporated herein by reference.

TECHNICAL FIELD

The present disclosure relates to a shift range control apparatus.

BACKGROUND

A shift range switching mechanism of an automatic transmission switches shift ranges, and includes a rotation member and an engagement member. The rotation member has, for example, a plate shape, and includes multiple recesses in accordance with each of the shift ranges. An engagement portion of the engagement member positions the rotation member by engaging to the recesses. A positioning portion of the rotation member includes the recesses and the engagement member.

SUMMARY

The present disclosure provides a shift range control apparatus applied to a shift range switching mechanism including a rotation member that includes multiple recesses and an engagement member that positions the rotation member by engaging to the recesses. The shift range control apparatus may control a motor of a shift actuator connected to the rotation member to switch a shift range.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
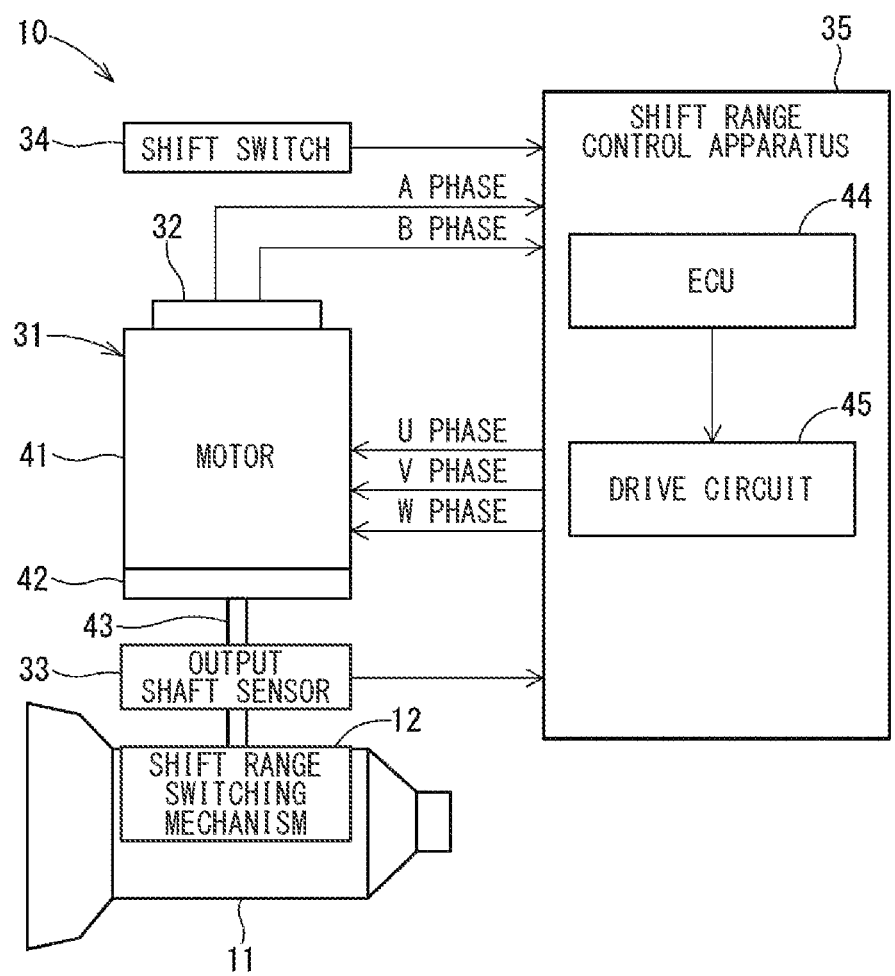
FIG. 1 is a diagram explaining a shift-by-wire system to which a shift range control apparatus according to a first embodiment is applied.

A shift range switching mechanism of an automatic transmission switches shift ranges, and includes a rotation member and an engagement member. The rotation member has, for example, a plate shape, and includes multiple recesses with respect to each of the shift ranges. An engagement portion of the engagement member positions the rotation member by engaging to the recesses. A positioning portion of the rotation member includes the recesses and the engagement member.

For example, a shift-by-wire system described is a system electrically controlling the shift range switching mechanism. This system includes a shift actuator connected to the rotation member of the shift range switching mechanism, and a shift range control apparatus. The shift actuator decelerates rotation of the motor, and performs output. The shift range control apparatus grasps a current shift range based on an output signal of an output shaft sensor placed in the output shaft, and switches the shift range to a target shift range.

The shift range control apparatus calculates a target angle of a motor of the shift actuator based on an output signal of an output shaft sensor. Therefore, a detection accuracy of the output shaft sensor is directly linked to a positioning accuracy of the motor. Accordingly, when a highly accurate output shaft sensor is not employed, a situation where the engagement portion of the engagement member is not positioned at a bottom of a recess of a rotation member may occur. Switching to the target shift range may not occur.

An example embodiment provides a shift range control apparatus capable of surely switching to a target shift range regardless of a detection accuracy of an output shaft sensor.

In an example embodiment, the shift range control apparatus is applied to a shift range switching mechanism including a rotation member that includes multiple recesses and an engagement member that positions the rotation member by engaging to the recesses. The shift range control apparatus controls a motor of a shift actuator connected to the rotation member to switch a shift range.

The shift range control apparatus includes a rotation speed detection section that detects an output shaft rotation speed corresponding to a rotation speed of the output shaft of the shift actuator and a movement determination section.

In an example embodiment, the movement determination section determines that an engagement portion of the engagement member has relatively moved to a bottom of one of the recesses of the rotation member when the output shaft rotation speed is equal to or lower than a predetermined value during switching of the shift range. The term of "the bottom of one of the recesses" may mean the deepest portion in the recess.

In another example embodiment, a movement determination section determines that the engagement portion of the engagement member has relatively moved to the bottom of one of the recesses of the rotation member based on the motor rotation speed and the output shaft rotation speed that are scaled to each other by a reduction ratio from the motor to the output shaft, when a difference between the motor rotation speed and the output shaft rotation speed is equal to or higher than a predetermined value in a case where the output shaft rotation speed is lower than the motor rotation speed during the switching of the shift range.

Further, in another example embodiment, a movement determination section determines that the engagement portion of the engagement member has relatively moved to the bottom of one of the recesses of the rotation member when a predetermined time elapses after the output shaft rotation speed is equal to or higher than a predetermined value during the switching of the shift range.

In this manner, it may be possible to determine that the engagement portion of the engagement member has relatively moved to the bottom of the one of the recesses of the rotation member. When the engagement portion relatively moves to the bottom of the one of the recesses in accordance with the target shift range and the rotation of the motor stops, it may be possible to finish a shift range switching operation in a state where the shift range is switched to the target shift range. The accuracy of the determination by a movement determination portion does not affect the detection accuracy of the output shaft sensor. Accordingly, it may be possible to surely switch to the target shift range regardless of the detection accuracy of the output shaft sensor.

Hereinafter, multiple embodiments will be described with reference to the drawings. In the embodiments, substantially identical structural and functional parts are designated with the identical reference numerals thereby to simplify the description.

First Embodiment

A shift range control apparatus according to a first embodiment is applied to a shift-by-wire system of a vehicle. As shown in FIG. 1, a shift-by-wire system 10 is a system that electrically controls a shift range switching mechanism 12 of an automatic transmission 11.

<Shift Range Switching Mechanism>

Figure 2:
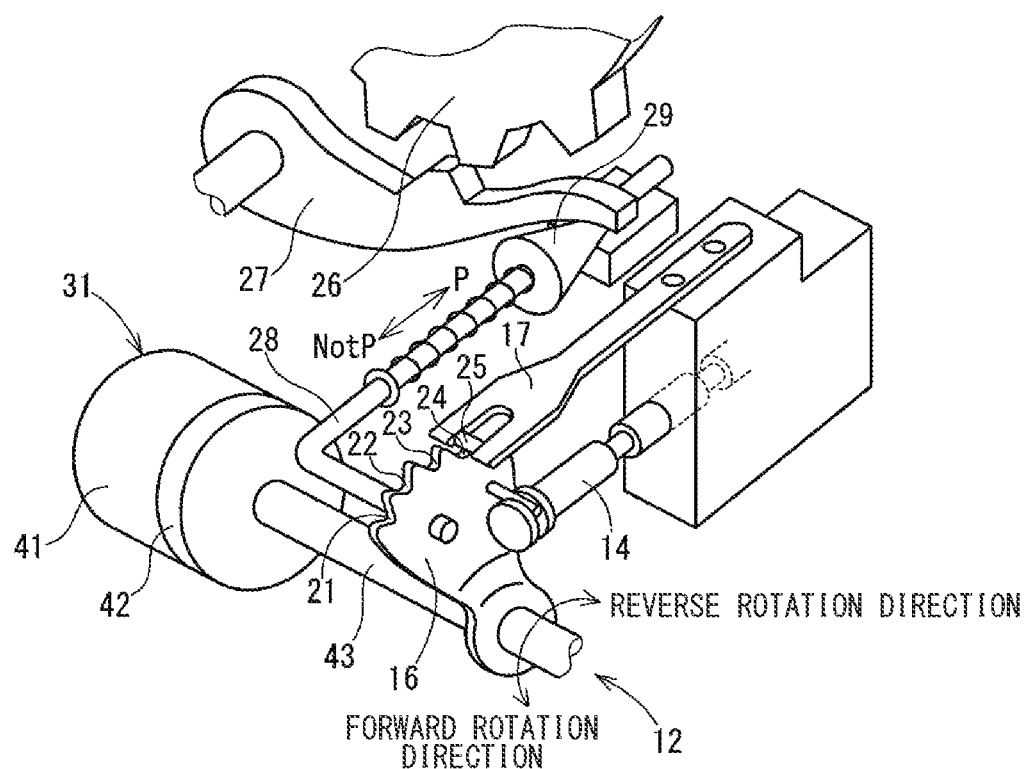
FIG. 2 is a perspective view of the shift range switching mechanism in FIG. 1.

The shift range switching mechanism 12 will be initially described with reference to FIG. 2.

The shift range switching mechanism 12 includes a detent plate 16 and a detent spring 17. The detent plate 16 changes a valve position of a range switching valve 14 of a hydraulic circuit for transmission in accordance with a rotation position. The shift range is switched in accordance with the valve position of the range switching valve 14. An outer peripheral portion of the detent plate 16 includes multiple recesses 21 to 24.

A pressing force by the detent spring 17 presses the detent spring 17 to the detent plate 16. An engagement portion 25 of the detent spring 17 positions a portion of the detent plate 16 by engaging to the one of the recesses 21 to 24. A portioning portion of the detent spring 17 includes the recesses 21 to 24 and the detent spring 17. When a rotation force equal to or higher than a predetermined force is applied to the detent plate 16, the detent spring 17 is elastically deformed. Thereby, the engagement portion 25 is movable between the recesses 21 to 24. The recesses 21 to 24 correspond to a parking range, a reverse range, a neutral range, and a drive range, respectively.

The shift range switching mechanism 12 further includes a park gear 26, a park pole 27, and a park rod 28 as components for providing a parking lock. The park gear 26 integrally rotates with an output shaft of the automatic transmission 11. The park pole 27 can move toward or away from the park gear 26, and locks the rotation of the output shaft of the automatic transmission 11 by meshing with the park gear 26. The park rod 28 is connected to the detent plate 16. When the rotation position of the detent plate 16 is a position in accordance with the parking range, the park rod 28 pushed a conical body 29 of a tip portion to a lower side of the park pole 27. Thereby, the park pole 27 is pushed up. The park pole 27 and the park gear 26 are meshed.

(Shift-by-Wire System)

The shift-by-wire system 10 will be described with reference to FIG. 1.

As shown in FIG. 1, the shift-by-wire system 10 includes a shift actuator 31, an encoder 32, an output shaft sensor 33, a shift switch 34, and a shift range control apparatus 35.

The shift actuator 31 corresponds to a rotary electric actuator that outputs rotation power, and includes a motor 41 and a reduction gear 42. The reduction gear 42 decelerates the rotation of the motor 41, and performs output from an output shaft 43. The output shaft 43 is connected to the detent plate 16 (see FIG. 2) of the shift range switching mechanism 12.

The encoder 32 detects a rotation angle of a rotor of the motor 41. The encoder 32 synchronizes with the rotation of the rotor to output pulse signals of an A-phase and a B-phase to the shift range control apparatus 35.

The output shaft sensor 33 detects the rotation angle of the output shaft 43, and outputs a signal in accordance with the rotation angle of the output shaft 43 to the shift range control apparatus 35. The output signal of the output shaft sensor 33 is used for grasping a current shift range and for calculating a rotation speed of the output shaft 43, or the like.

The shift switch 34 is operated by a driver of a vehicle 10, and outputs a signal in accordance with a shift range required by the driver. Hereinafter, the shift range required by the driver may be appropriately referred to as a "target shift range".

The shift range control apparatus 35 includes an ECU 44 mainly provided by a microcomputer, and a drive circuit 45 including an inverter that controls energization of a winding of the motor 41. The ECU 44 outputs an instruction signal for driving the motor 41 in accordance with the encoder 32, the output shaft sensor 33, the shift switch 34, and a vehicle speed sensor or the like (not shown). The drive circuit 45 performs rotation drive of the motor 41 in accordance with the instruction signal from the ECU 44.

(Shift Range Control Apparatus)

Figure 3:
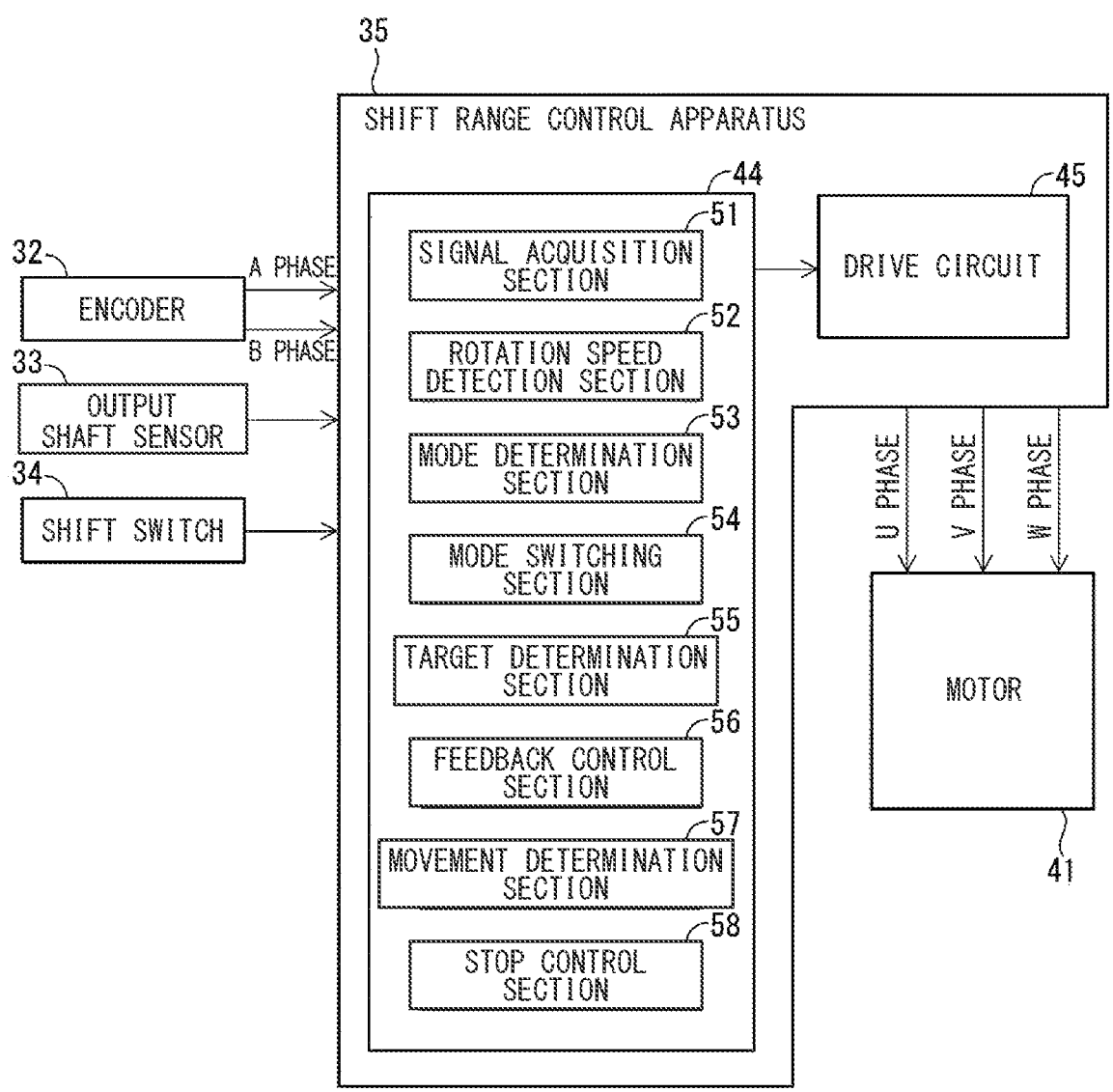
FIG. 3 is a diagram explaining function sections of an ECU of the shift range control apparatus in FIG. 1.

The detailed configuration of the ECU 44 of the shift range control apparatus 35 will be now described with reference to FIG. 3.

The ECU 44 includes a signal acquisition section 51 that acquires the output signal of each sensor, and a rotation speed detection section 52. The rotation speed detection section 52 detects an output shaft rotation speed No (that is, the rotation speed of the output shaft 43) based on the output signal of the output shaft sensor 33, and detects a motor rotation speed Nm (that is, the rotation speed of the motor 41) based on the output signal of the encoder 32.

A drive mode of the motor 41 by the ECU 44 includes a standby mode, a feedback control mode, and a stop control mode. The ECU 44 includes a mode determination section 53 that determines that which one of the modes described above is currently set, and a mode switching section 54 that switches the drive mode. The drive mode is set to the standby mode when the ECU 44 is initialized.

The ECU 44 includes a target determination section 55 as the functional section in accordance with the standby mode. The target determination section 55 determines whether the target shift range is changed from the current shift range.

The mode switching section 54 switches the drive mode to the feedback control mode when the target shift range is changed from the current shift range.

The ECU 44 includes a feedback control section 56 and a movement determination section 57 as the functional section in accordance with the feedback control mode.

The feedback control section 56 sets the target angle of the motor 41 in accordance with the target shift range, based on the output signal of the output shaft sensor 33. The feedback control section 56 rotates the motor 41 by feedback control based on an encoder count value and the motor rotation speed.

The movement determination section 57 determines where the output shaft 43 is positioned in multiple range determination areas, based on the output shaft sensor 33. The range determination area includes a P range determination area, an R range determination area, an N range determination area, and a D range determination area. The P range determination area is set to an area where the engagement portion 25 is positioned at the recess 21. The R range determination area is set to an area where the engagement portion 25 is positioned at the recess 22. The N range determination area is set to an area where the engagement portion 25 is positioned at the recess 23. The D range determination area is set to an area where the engagement portion 25 is positioned at the recess 24.

Hereinafter, the range determination area determined to be where the output shaft 43 is positioned may be referred to as a "current range determination area". The range determination area when the output shaft 43 is positioned at a position where the target shift range is satisfied, may be referred to as a "target range determination area".

The movement determination section 57 determines that the engagement portion 25 has moved to the bottom of the recess in accordance with the current range determination area among the recesses 21 to 24, when the output shaft rotation speed No is equal to or lower than a predetermined value N1 during the switching of the shift range.

The movement determination section 57 determines that the engagement portion 25 has moved to the bottom of the recess in accordance with the target range determination area among the recesses 21 to 24, when the current range determination area matches the target range determination area and also the output shaft rotation speed No is equal to or lower than the predetermined value N1 during the switching of the shift range. That is, in the case described above, the movement determination section 57 determines that the engagement portion 25 has moved to the bottom of the recess in accordance with the target shift range.

The mode switching section 54 switches the drive mode to the stop control mode when it is determined that the engagement portion 25 has moved to the bottom of the recess in accordance with the target shift range.

The ECU 44 includes a stop control section 58 as the functional section in accordance with the stop control mode. While the rotation of the motor 41 stops, the stop control section 58 determines whether the rotation stop is completed. Here, during the switching of the shift range, the engagement portion 25 accelerates toward the bottom of the recess after passing over a ridge between the pair of recesses. As the result, the rotation speeds of the detent plate 16 and the output shaft 43 significantly increase compared to the rotation speed of the motor 41. Therefore, when the engagement portion 25 moves to the bottom of the recess in accordance with the target shift range, the detent plate 16 and the output shaft 43 precede the rotor of the motor 41 by play of the rotation transmission system from the rotor of the motor 41 to the output shaft 43 to be positioned at the bottom of the recess. Accordingly, while there is the play described above, the detent plate 16 and the output shaft 43 do not rotate even when the motor 41 rotates. The stop control section 58 stops the rotation of the motor 41 while there is the play described above after the engagement portion 25 moves to the bottom of the recess in accordance with the target shift range.

The mode switching section 54 switches the drive mode to the standby mode when it is determined that the rotation stop of the motor 41 is completed.

Each of functional sections 51 to 58 of the ECU 44 may be provided by hardware process with a dedicated logic circuit, or by software process by executing, on a CPU, a program stored, in advance, in a memory such as a computer readable non-transitory tangible storage medium, or by a combination of the hardware process and the software process. Which part of the function sections 51 to 58 is provided by the hardware process, and which part of the function sections 51 to 58 is provided by the software process can be appropriately selected.

<Process Executed by ECU>

Figure 4:
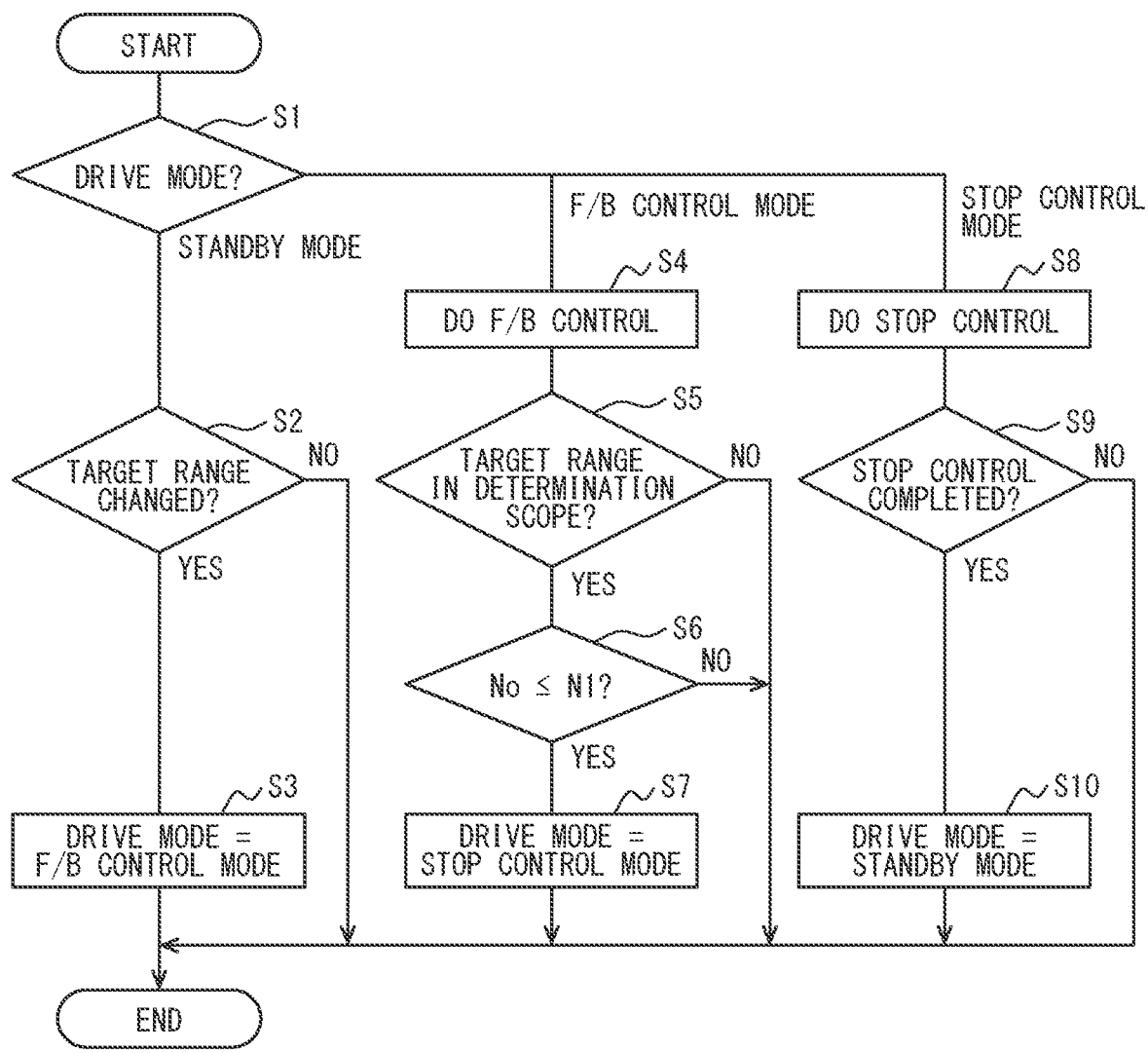
FIG. 4 is a flowchart explaining a process executed by the ECU in FIG. 3.

Next, a series of processes executed for the shift range switching by the ECU 44 will be described with reference to FIG. 4. A routine shown in FIG. 4 is repeatedly executed after a startup of the ECU 44. In the following description, "S" means a step.

In S1 of FIG. 4, it is determined that which one of standby mode, the feedback control mode, and the stop control mode is currently set to the drive mode.

When the drive mode is the standby mode, the process shifts to S2.

When the drive mode is the feedback control mode, the process shifts to S4.

When the drive mode is the stop control mode, the process shifts to S8.

In S2, it is determined whether the target shift range is changed from the current shift range.

When the target shift range is changed (S2: YES), the process shifts to S3.

When the target shift range is not changed (S2: NO), the process exits from the routine of FIG. 4.

In S3, the drive mode is switched to the feedback control mode. After S3, the process exits from the routine of FIG. 4.

In S4, the feedback control is performed. Specifically, in a case of the first time of the feedback control, first, the target angle of the motor 41 is set based on the output signal of the output shaft sensor 33. Next, the feedback control based on the encoder count value and the motor rotation speed No causes the motor 41 to perform the rotation drive. On the other hand, when the feedback control has been already performed, the feedback control continues. After S4, the process exits from the routine of FIG. 4.

In S5, it is determined whether the output shaft 43 is positioned in the target range determination area based on the output signal of the output shaft sensor 33.

When the output shaft 43 is positioned in the target range determination area (S5: YES), the process shifts to S6.

When the output shaft 43 is not positioned in the target range determination area (S5: NO), the process exits from the routine of FIG. 4.

In S6, it is determined whether the output shaft rotation speed No is equal to or lower than the predetermined value N1.

When the output shaft rotation speed No is equal to or lower than the predetermined value N1 (S6: YES), the process shifts to S7.

When the output shaft rotation speed No is not equal to or lower than the predetermined value N1 (S6: NO), the process exits from the routine of FIG. 4.

In S7, the drive mode is switched to the stop control mode. After S7, the process exits from the routine of FIG. 4.

In S8, the control of stopping the rotation of the motor 41 is performed. After S8, the process shifts to S9.

In S9, it is determined whether the rotation stop control of the motor 41 is completed.

When the rotation stop control is completed (S9: YES), the process shifts to S10.

When the rotation stop control is not completed (S9: NO), the process exits from the routine of FIG. 4.

In S10, the drive mode is switched to the standby mode. After S10, the process exits from the routine of FIG. 4.

Specific Operation Example

Next, one example of operation by the ECU 44 will be described with reference to FIG. 5 and FIG. 6. This example corresponds to an operation example when the target shift range is changed to the drive range in a case where the current shift range is the parking range.

Figure 5:
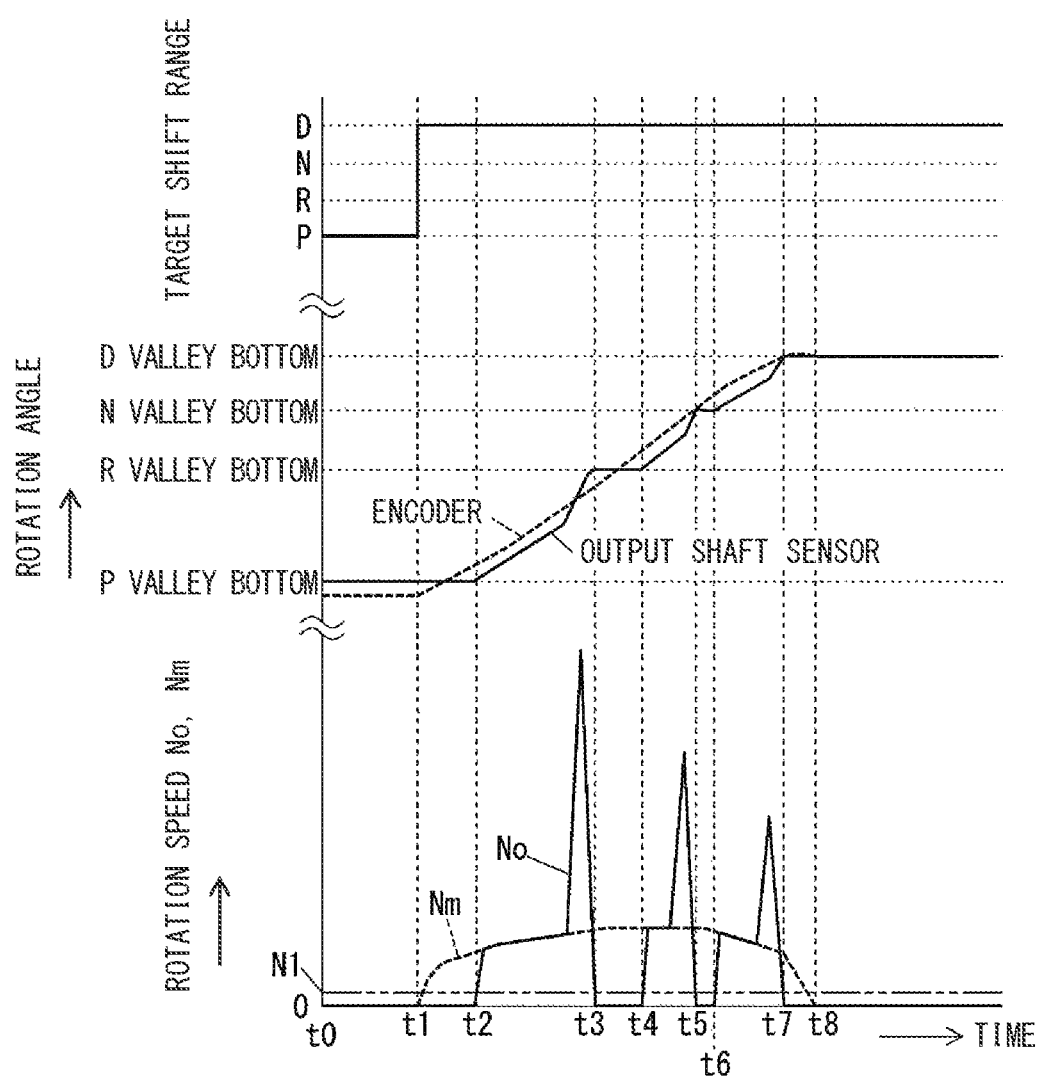
FIG. 5 is a time chart showing transition for a rotation angle and a rotation speed of the output shaft, and a rotation angle and a rotation speed of the motor, when the ECU in FIG. 3 performs switching of the shift range.
Figure 6:
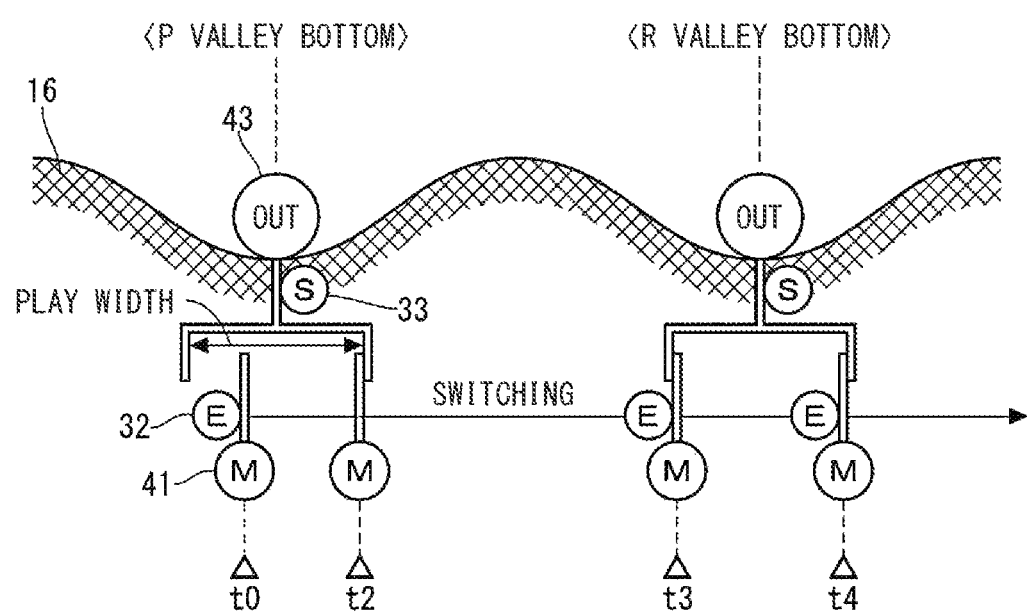
FIG. 6 is a schematic view explaining play of a rotation transmission system from a motor of a shift actuator to an output shaft in FIG. 1.

In FIG. 5, the output shaft rotation speed No of a vertical axis is described with being converted to the motor rotation speed Nm. That is, in FIG. 5, the motor rotation speed [Nm] and the output shaft rotation speed [No×α] are mutually scaled by a reduction speed ratio α from the motor 41 to the output shaft 43. The [Nm] and the [No×α] are shown to be overlapped. Hereinafter, when comparing to the two, it is premised to use the ones mutually scaled. However, then, the ones are described as the "motor rotation speed Nm" and the "output shaft rotation speed No". A description of the reduction speed ratio α is omitted. The similar is applied to the description of the drawings. When an "Nm–No" is described, the "Nm–No" means a difference between the Nm and the No that are mutually scaled. The term of "mutually scaled" may be referred to as a combination of "[Nm]" and "[No×α]" or a combination of "[Nm÷α]" and "[No]".

In the following description, a "P valley bottom", an "R valley bottom", an "N valley bottom", and a "D valley bottom" may be referred to as the bottom (that is, the deepest point) of each of the recesses 21, 22, 23, and 24.

As shown in FIG. 5, at a time t0 before a shift range switching start, both of the motor rotation speed Nm and the output shaft rotation speed No are 0. The engagement portion 25 of the detent spring 17 is positioned at the P valley bottom, the output shaft 43 has the corresponding rotation angle. In the other hand, the rotor of the motor 41 is in a state where there is the play of the rotation transmission system from the rotor to the output shaft 43. As shown in FIG. 6, there is no play at the time to.

At a time t1 of FIG. 5, the target shift range is changed to the drive range, and the switching of the shift range starts. At this time t1, the determination of S2 in FIG. 4 is positive, and the drive mode is changed to the feedback control mode.

In a term from the time t1 to a time t2 in FIG. 5, although the motor 41 rotates, the output shaft 43 does not rotate since there is the play.

At the time t2 of FIG. 5, there is no play. Immediately after this, the output shaft 43 starts to rotate. As shown in FIG. 6, there is no play at the time t2.

In the first half of a term from the time t2 to a time t3 of FIG. 5, that is, before the engagement portion 25 passes over the ridge between the recess 21 and the recess 22, the output shaft rotation speed No follows the motor rotation speed Nm.

In the second half of a term from the time t2 to the time t3 of FIG. 5, after the engagement portion 25 passes over the ridge between the recess 21 and the recess 22, the detent plate 16 rotates so that the engagement portion 25 falls to the bottom of the recess 22. The output shaft rotation speed No increases. As the result, the output shaft 43 precedes the motor 41 by the play. After the engagement portion 25 passes over the ridge between the recess 21 and the recess 22, the determination of S5 in FIG. 4 is positive.

At the time t3 of FIG. 5, the engagement portion 25 moves substantially to the R valley bottom, the output shaft rotation speed No is equal to or lower than the predetermined value N1. As shown in FIG. 6, at the time t3, the output shaft 43 precedes the motor 41 by the amount of play, and moves substantially to the rotation angle corresponding to the R valley bottom. This time, the target range determination area is the D range determination area, and the current range determination area does not match the target range determination area. Therefore, the determination of S5 in FIG. 4 is negative.

At a term from the time t3 to a time t4 of FIG. 5, although the motor 41 rotates, the output shaft 43 does not rotate since there is the play.

An operation in a term from times t4 to t7 of FIG. 5 is similar to that in the term from the times t2 to t4.

At a time t7 of FIG. 5, the current range determination area matches the target range determination area. Therefore, the determinations of S5 and S6 in FIG. 4 are positive, and the drive mode is changed to the stop control mode in S7.

After the time t7 of FIG. 5, stop control is performed. At a time t8, with completion of the stop control, the drive mode is changed to the standby mode in S10 of FIG. 4.

Effect

As described above, in the first embodiment, the shift range control apparatus 35 is applied to the shift range switching mechanism 12 that includes the detent plate 16 changing the valve position of the shift range switching valve 14 in accordance with the rotation position and the detent spring 17 stopping the rotation of the detent plate 16 by engaging to one of the multiple recesses 21 to 24 of the detent plate 16. The shift range control apparatus 35 switches the shift range by controlling the motor 41 of the shift actuator 31 connected to the detent plate 16.

The shift range control apparatus 35 includes the rotation speed detection section 52 that detects the output shaft rotation speed No corresponding to the rotation speed of the output shaft 43 of the shift actuator 31 and the movement determination section 57.

The movement determination section 57 determines that the engagement portion 25 of the detent spring 17 has relatively moved to the bottom of the recesses 21 to 24 of the detent plate 16, when the output shaft rotation speed No is equal to or lower than the predetermined value N1 during the switching of the shift range.

In this manner, it can be determined that the engagement portion 25 of the detent spring 17 has relatively moved to the bottom of the recesses 21 to 24 of the detent plate 16. By stopping the rotation of the motor 41 when the engagement portion 25 has relatively moved to the bottom of the recess in accordance with the target shift range among the recesses 21 to 24, it may be possible to finish the shift range switching operation in a state of being switched to the target shift range. The accuracy of the determination by the movement determination section 57 does not affect the detection accuracy of the output shaft sensor 33. Accordingly, it may be possible to surely switch to the target shift range regardless of the detection accuracy of the output shaft sensor 33.

The first embodiment includes the stop control section 58 finishing the switching of the shift range by stopping the rotation of the motor 41, when the movement determination section 57 determines that the engagement portion 25 has relatively moved to the bottom of the recess in accordance with the target shift range.

Accordingly, it may be possible to finish the shift range switching operation in a state of being switched to the target shift range.

Second Embodiment

Figure 7:
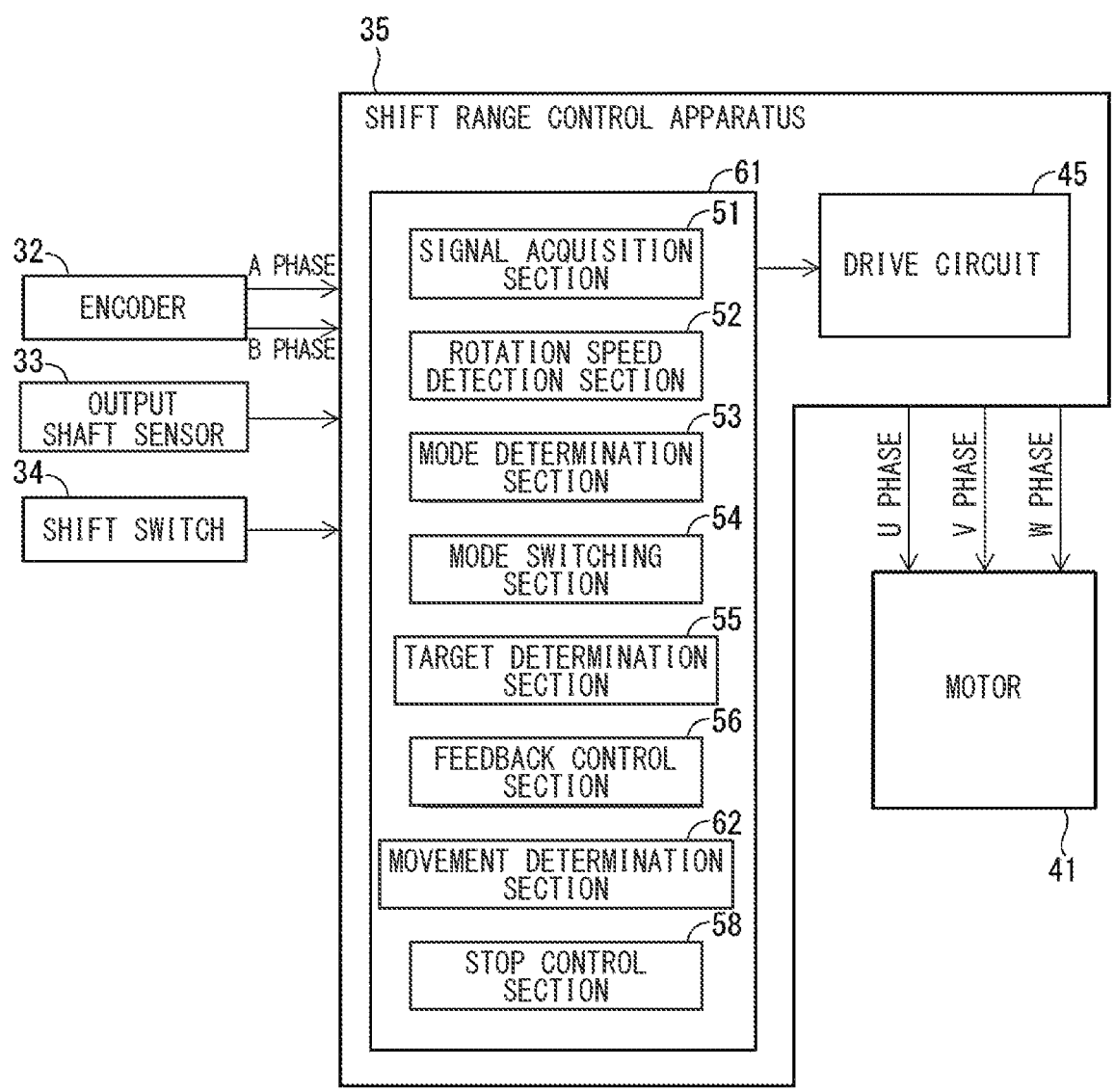
FIG. 7 is a diagram explaining function sections of the ECU in the shift range control apparatus according to a second embodiment.

In a second embodiment, as shown in FIG. 7, it is assumed of a scope where the output shaft rotation speed No is lower than the motor rotation speed Nm during the switching of the shift range. When a difference between the motor rotation speed Nm and the output shaft rotation speed No is equal to or higher than a predetermined value N2, a movement determination section 62 of an ECU 61 determines that the engagement portion 25 of the detent spring 17 has relatively moved to the bottom of the recesses 21 to 24 of the detent plate 16.

Figure 8:
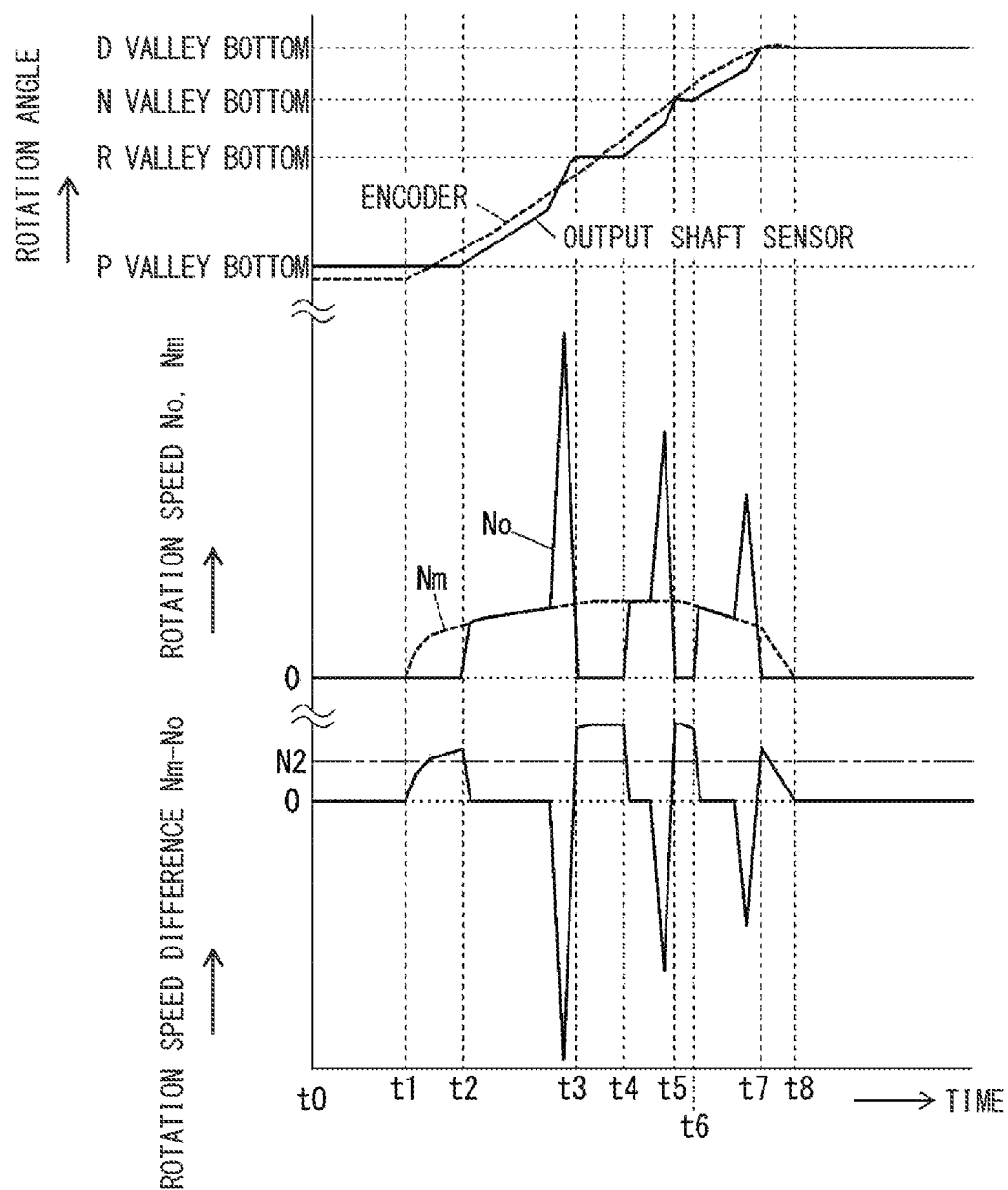
FIG. 8 is a time chart showing transition for the rotation angle and the rotation speed of the output shaft, the rotation angle and the rotation speed of the motor, and a difference between the rotation speed of the motor and the rotation speed of the output shift, when the ECU in FIG. 7 performs the switching of the shift range.

At the times t3, t5, and t7 of FIG. 8, it is determined that the difference between the motor rotation speed Nm and the output shaft rotation speed No is equal to or higher than the predetermined value N2. FIG. 8 corresponds to an operation example when target shift range is changed to the drive range in a case where the current shift range is the parking range.

Returning to FIG. 7, during the switching of the shift range, when the current range determination area matches the target range determination area and also when the difference between the motor rotation speed Nm and the output shaft rotation speed No is equal to or higher than the predetermined value N2 in the area where the output shaft rotation speed No is lower than the motor rotation speed Nm, the movement determination section 62 determines that the engagement portion 25 has moved to the bottom of the recess in accordance with the target range determination area among the recesses 21 to 24.

Figure 9:
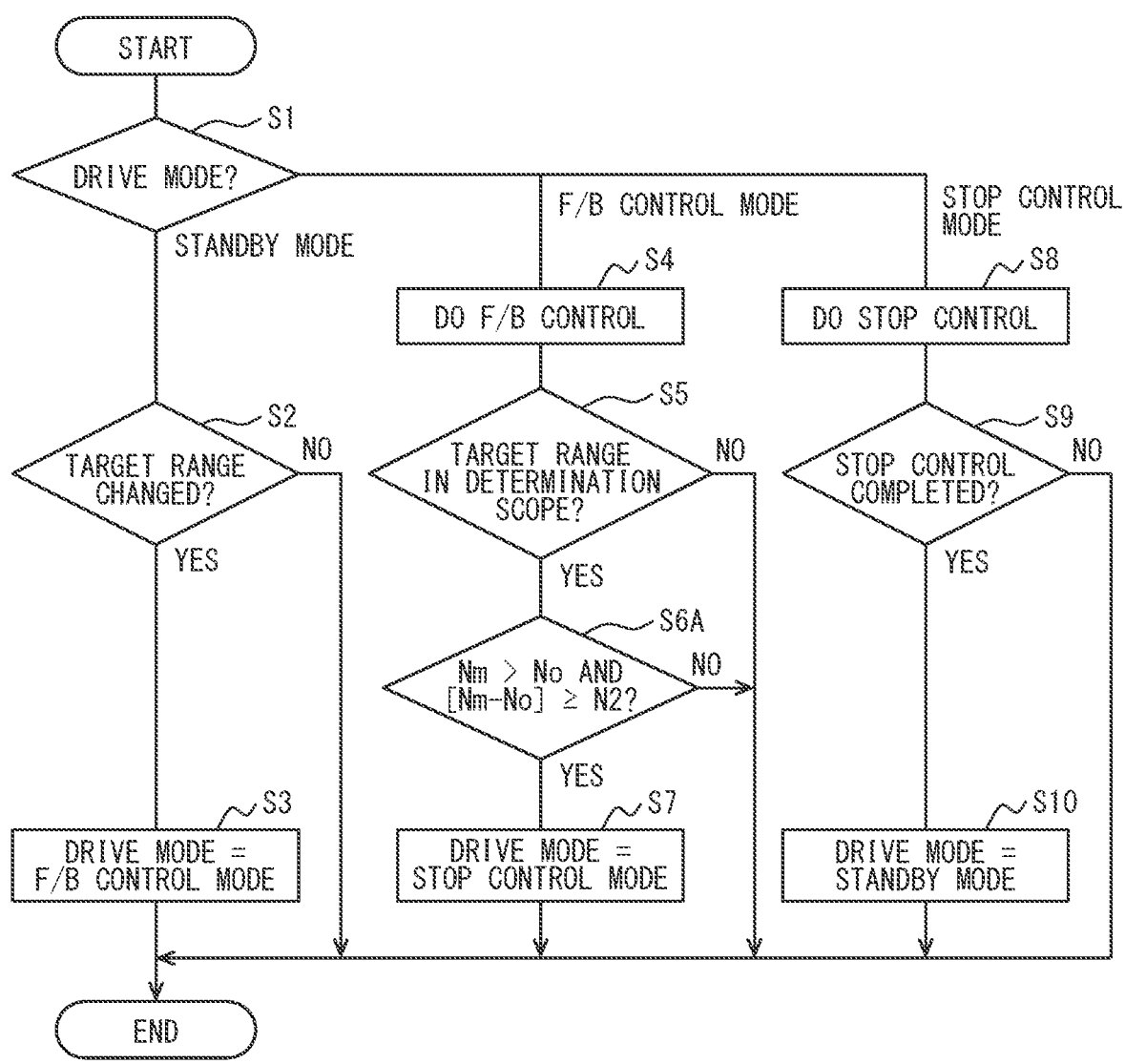
FIG. 9 is a flowchart explaining a process executed by the ECU in FIG. 7.

FIG. 9 shows a process executed by the ECU 61 for the shift range switching. In S6A, it is determined whether the output shaft rotation speed No is lower than the motor rotation speed Nm and also the difference between the motor rotation speed Nm and the output shaft rotation speed No is equal to or higher than the predetermined value N2.

When the difference between the motor rotation speed Nm and the output shaft rotation speed No is equal to or higher than the predetermined value N2 (S6A: YES), the process shifts to S7.

When the difference between the motor rotation speed Nm and the output shaft rotation speed No is not equal to or higher than the predetermined value N2 (S6A: NO), the process exits from the routine of FIG. 9.

As described above, in the second embodiment, the ECU 61 includes the movement determination section 62. It is assumed of the scope where the output shaft rotation speed No is lower than the motor rotation speed Nm during the switching of the shift range. When the difference between the motor rotation speed Nm and the output shaft rotation speed No is equal to or higher than the predetermined value N2, the movement determination section 62 determines that the engagement portion 25 of the detent spring 17 has relatively moved to the bottom of the recesses 21 to 24 of the detent plate 16.

In this manner, it can be determined that the engagement portion 25 of the detent spring 17 has relatively moved to the bottom of the recesses 21 to 24 of the detent plate 16. Accordingly, the similar effect to the first embodiment can be provided.

Third Embodiment

Figure 10:
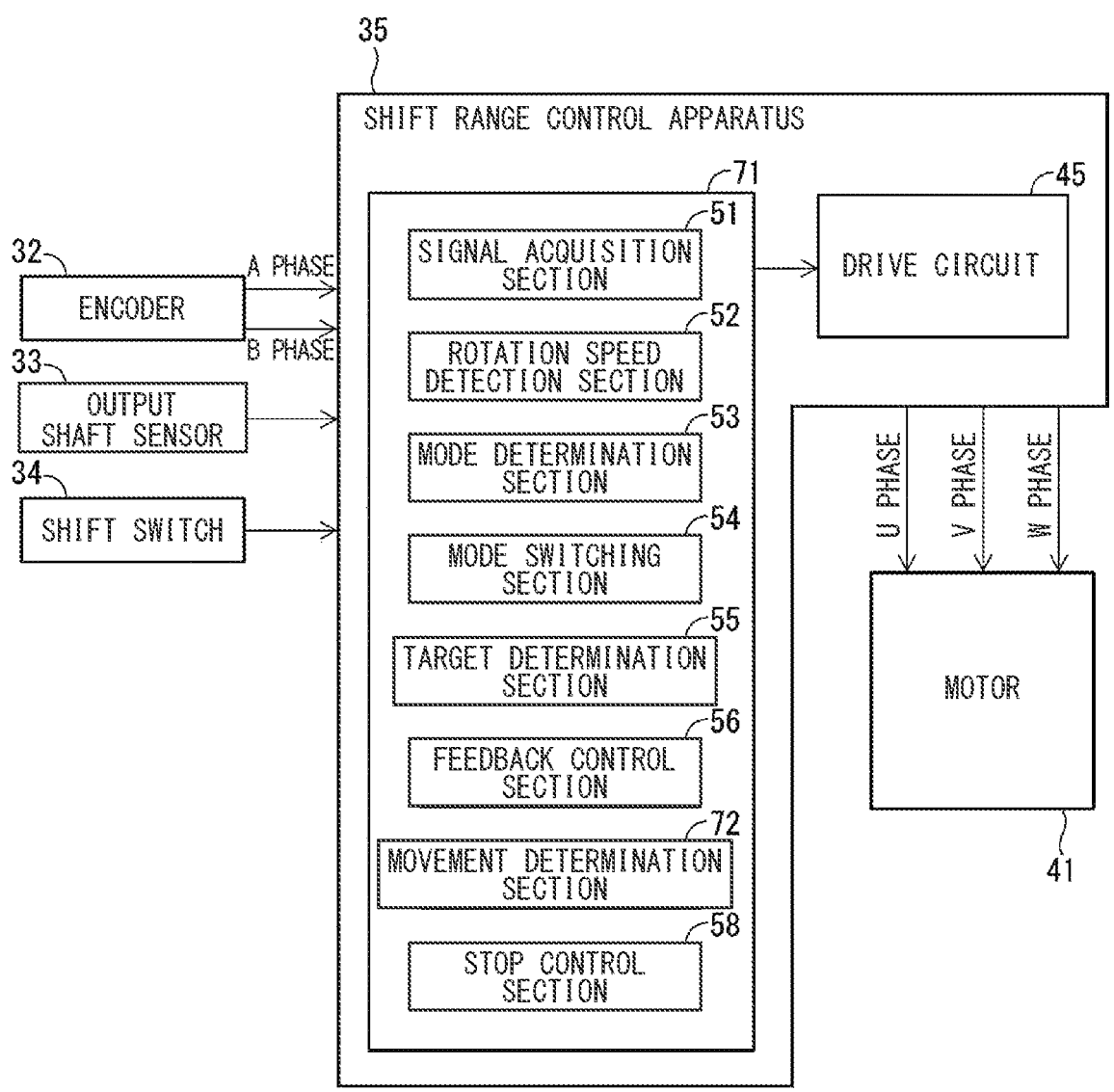
FIG. 10 is a diagram explaining function sections of the ECU in the shift range control apparatus according to a third embodiment.

In the third embodiment, as shown in FIG. 10, a movement determination section 72 of an ECU 71 determines that the engagement portion 25 has moved to the bottom of the recess in accordance with the target range determination area among the recesses 21 to 24, when a predetermined time T1 elapses after the output shaft rotation speed No is equal to or higher than a predetermined value N3 during the switching of the shift range. The predetermined value N3 is set to the output shaft rotation speed No that is not reached by the torque of the motor 41 itself.

Figure 11:
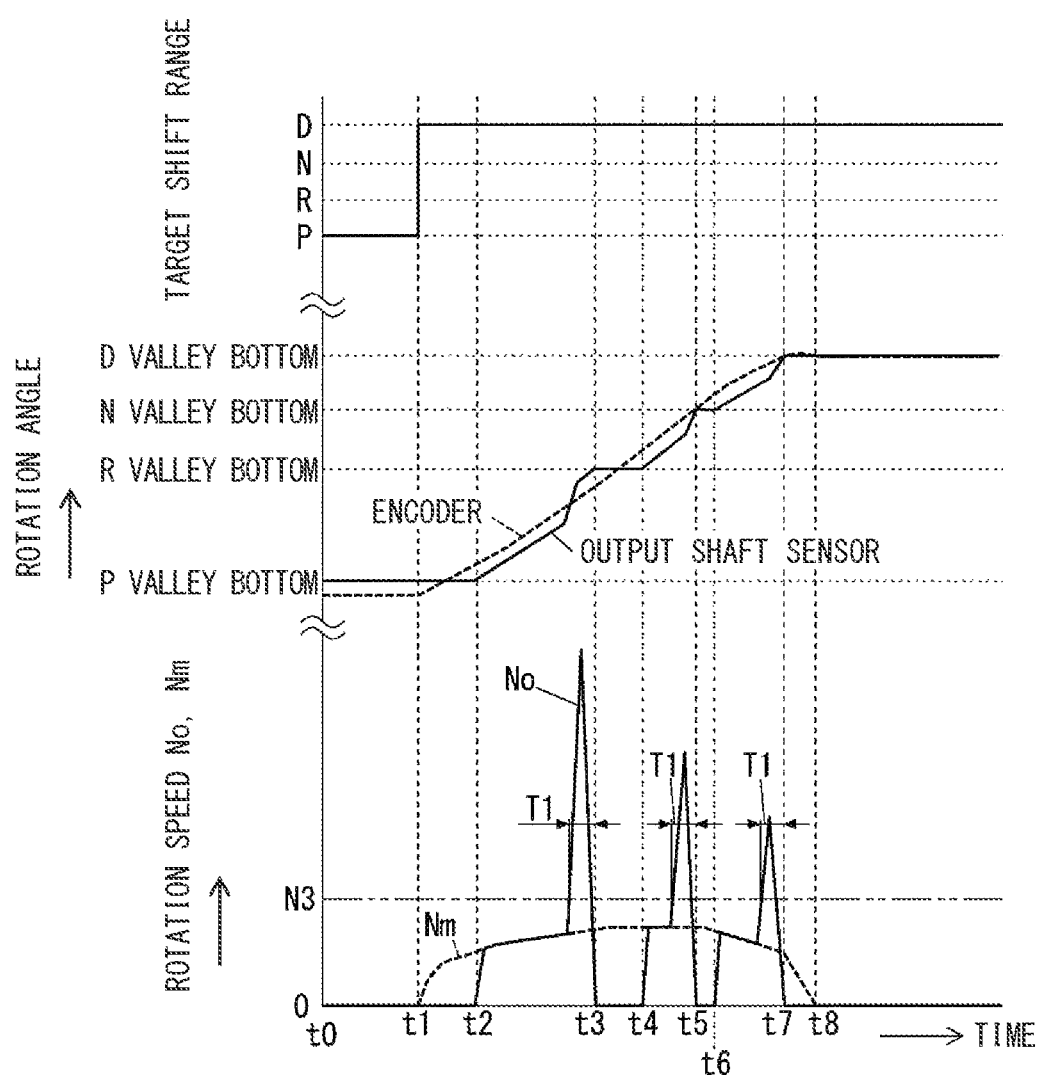
FIG. 11 is a time chart showing transition for the rotation angle and the rotation speed of the output shaft, and the rotation angle and the rotation speed of the motor, when the ECU in FIG. 10 performs the switching of the shift range.

At the times t3, t5, and t7 of FIG. 11, it is determined that the predetermined time T1 elapses after the output shaft rotation speed No is equal to or higher than the predetermined value N3. FIG. 11 corresponds to an operation example when target shift range is changed to the drive range in a case where the current shift range is the parking range.

Returning to FIG. 10, the movement determination section 72 determines that the engagement portion 25 has moved to the bottom of the recess in accordance with the target range determination area among the recesses 21 to 24, when the current range determination area matches the target range determination area and also the predetermined time T1 elapses after the output shaft rotation speed No is equal to or higher than the predetermined value N3 during the switching of the shift range.

Figure 12:
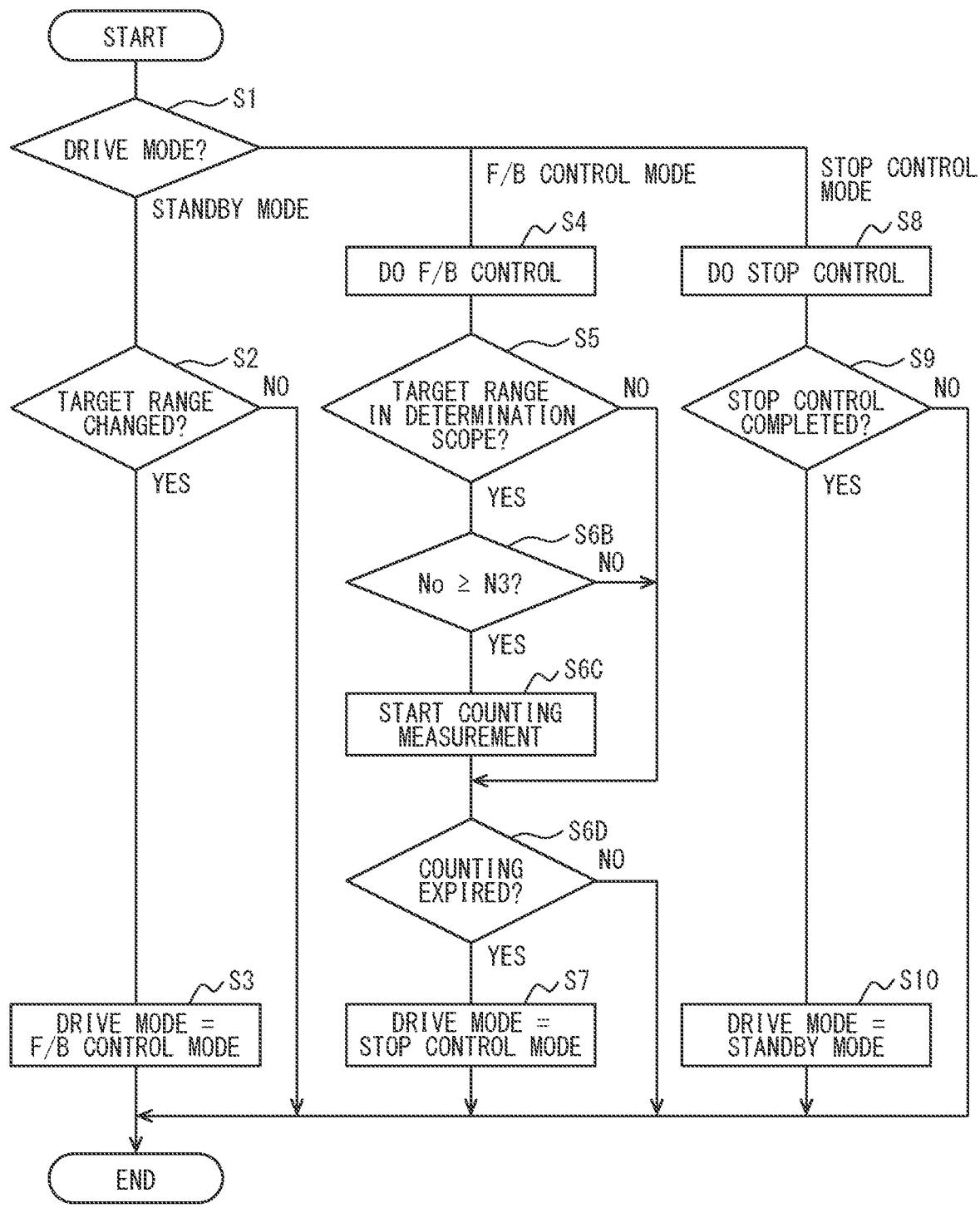
FIG. 12 is a flowchart explaining a process executed by the ECU in FIG. 10.

FIG. 12 shows a process executed by the ECU 71 for the shift range switching. In S6B, it is determined whether the output shaft rotation speed No is equal to or higher than the predetermined value N3 for the first time after the determination of S5 is positive.

When the output shaft rotation speed No is equal to or higher than the predetermined value N3 (S6B: YES) for the first time, the process shifts to S6C.

When the output shaft rotation speed No is not equal to or higher than the predetermined value N3 (S6B: NO) for the first time, the process exits from the process of FIG. 12.

In S6C, a counter for counting an elapsed time after the output shaft rotation speed No is equal to or higher than the predetermined value N3, starts measurement. After S6C, the process shifts to S6D.

In S6D, it is determined whether the counter is expired, that is, whether the count number by the counter is equal to or higher than a count number in accordance with the predetermined time T1.

When the counter is expired (S6D: YES), the process shifts to S7.

When the counter is not expired (S6D: NO), the process exits from the routine of FIG. 12.

As described above, in the third embodiment, the ECU 71 includes the movement determination section 72. When the predetermined time T1 elapses after the output shaft rotation speed No is equal to or higher than the predetermined value N3 during the switching of the shift range, the movement determination section 72 determines that the engagement portion 25 of the detent spring 17 has relatively moved to the bottom of the recesses 21 to 24 of the detent plate 16.

In this manner, it can be determined that the engagement portion 25 of the detent spring 17 has relatively moved to the bottom of the recesses 21 to 24 of the detent plate 16. Accordingly, the similar effect to the first embodiment can be provided.

Fourth Embodiment

Figure 13:
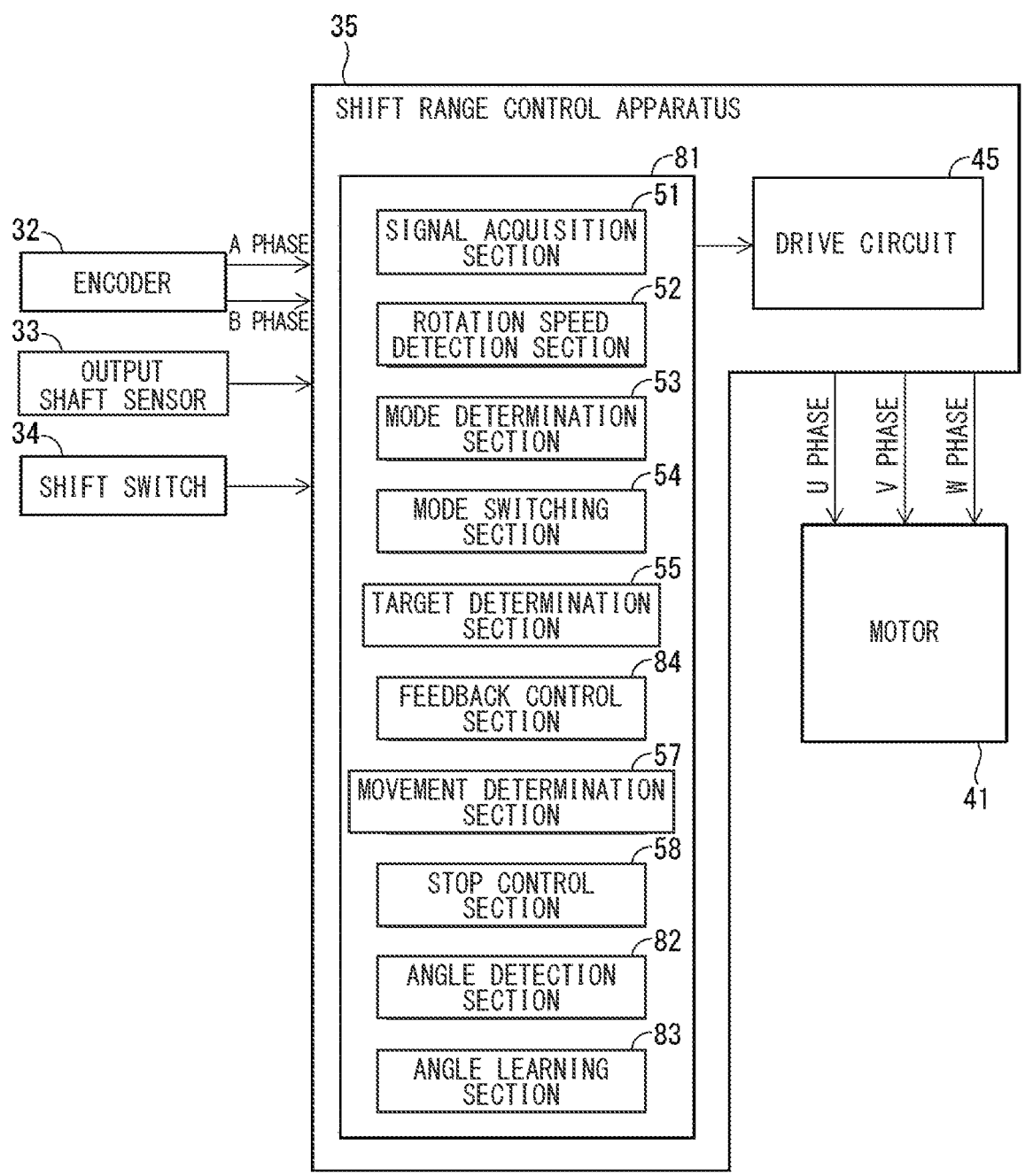
FIG. 13 is a diagram explaining function sections of the ECU in the shift range control apparatus according to a fourth embodiment.

In a fourth embodiment, as shown in FIG. 13, an ECU 81 includes an angle detection section 82 and an angle learning section 83. The angle detection section 82 detects the rotation angle of the output shaft 43 based on the output signal of the output shaft sensor 33. When the movement determination section 57 determines that the engagement portion 25 has relatively moved to the bottom of the recess, the angle learning section 83 learns the rotation angle of the output shaft 43 at the time of the determining as a valley position (that is, a rotation angle when the engagement portion 25 is positioned at the bottom of the recess). When the shift range is switched, the output shaft 43 is rotated toward the rotation angle learned by the angle learning section 83. The learning of the rotation angle by the angle learning section 83 is performed at an initial operation in an assembly plant or the like and also when the operation is performed from one end to the other end in the range determination area (that is, when the switching is performed from the parking range to the drive range).

A feedback control section 84 corresponds to a motor control section.

When the angle learning section 83 learns the rotation angle, the feedback control section 84 rotates the motor 41 slower compared with a case where the learning is not executed.

Figure 14:
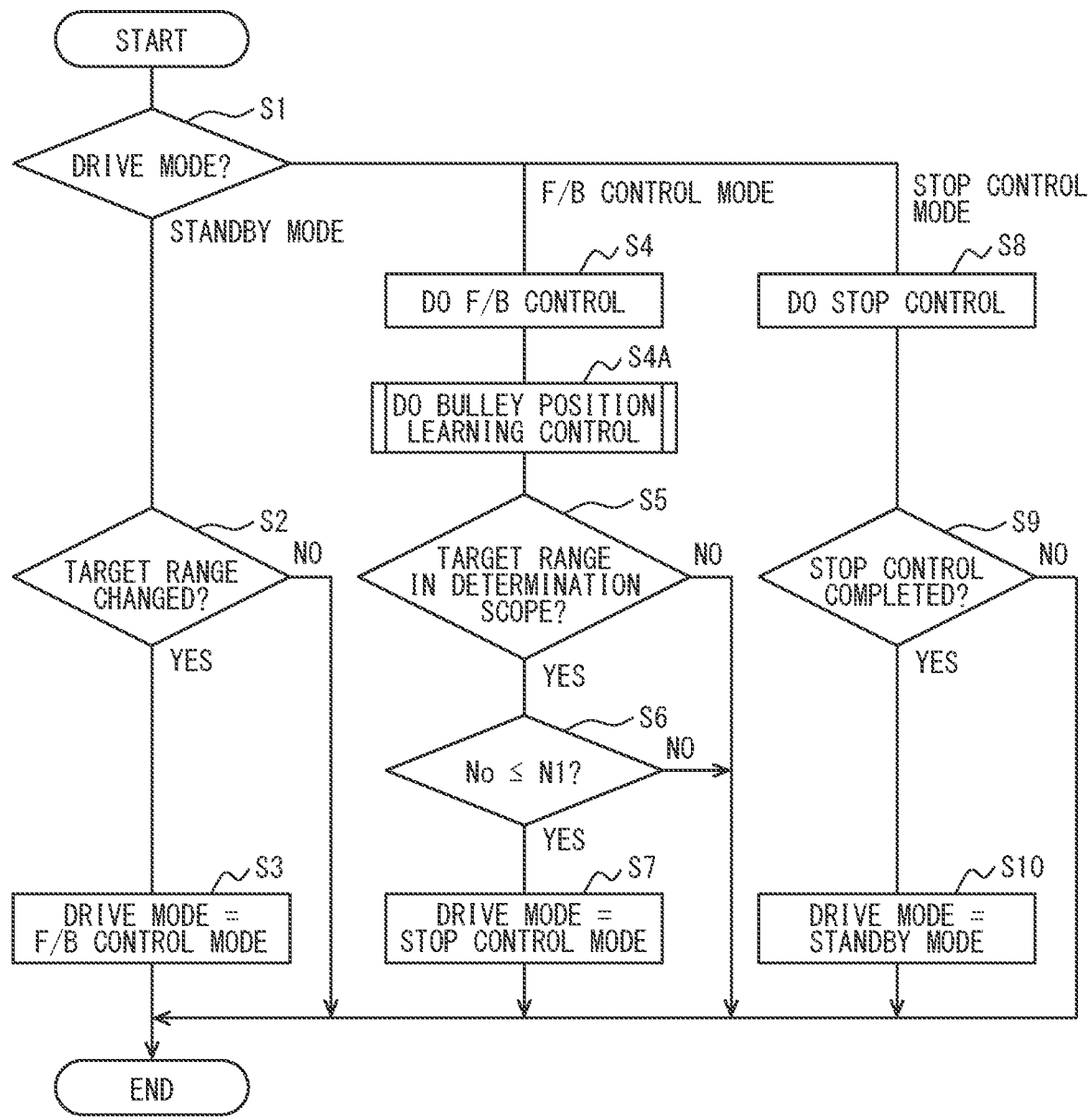
FIG. 14 is a main flowchart explaining a process executed by the ECU in FIG. 13.

FIG. 14 shows the process executed by the ECU 81 for shift range switching. In S4A after S4, a subroutine for valley position learning control shown in FIG. 15 is called up and executed.

Figure 15:
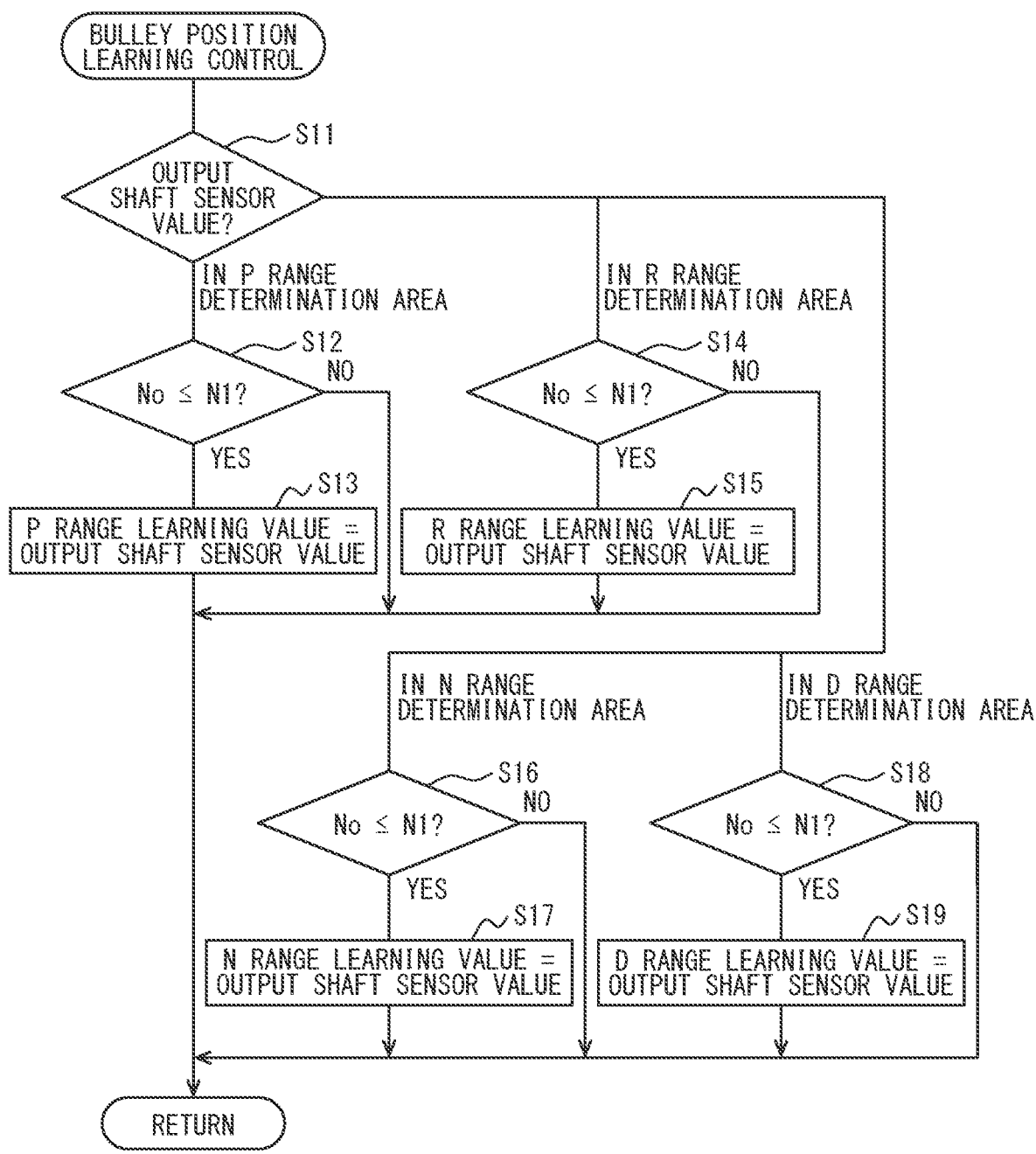
FIG. 15 is a sub flowchart explaining a process executed by the ECU in FIG. 13.

When a subroutine of FIG. 15 starts, in S11, it is determined that the output shaft sensor value (that is, the rotation angle calculated based on the output signal of the output shaft sensor 33) is in which range determination area.

When the output shaft sensor value is in the P range determination area, the process shifts to S12.

When the output shaft sensor value is in the R range determination area, the process shifts to S14.

When the output shaft sensor value is in the N range determination area, the process shifts to S16.

When the output shaft sensor value is in the D range determination area, the process shifts to S18.

Process contents of S12, S14, S16, and S18 are similar to the process contents of S6 of FIG. 4 in the first embodiment.

In S13, the current output shaft sensor value is learned as a P range learning value (that is, a rotation angle when the engagement portion 25 is positioned at the bottom of the recess 21).

In S15, the current output shaft sensor value is learned as a R range learning value (that is, a rotation angle when the engagement portion 25 is positioned at the bottom of the recess 22)

In S17, the current output shaft sensor value is learned as an N range learning value (that is, a rotation angle when the engagement portion 25 is positioned at the bottom of the recess 23).

In S19, the current output shaft sensor value is learned as a D range learning value (that is, a rotation angle when the engagement portion 25 is positioned at the bottom of the recess 24).

After S13, S15, S17 and S19, the process returns to the routine of FIG. 14.

The process of S4A of FIG. 14 is executed at the initial operation in the assembly plant or the like.

As described above, in the fourth embodiment, the ECU 81 includes the angle detection section 82 and the angle learning section 83. The angle detection section 82 detects the rotation angle of the output shaft 43 based on the output signal of the output shaft sensor 33. When the movement determination section 57 determines that the engagement portion 25 has relatively moved to the bottom of the recess, the angle learning section 83 learns the rotation angle of the output shaft 43 at the time of the determining, as the rotation angle when the engagement portion 25 is positioned at the bottom of the recess.

By learning the valley position in a vehicle mounted state in this manner, it may be possible to absorb variations in the single sensor and assembly variations in the motor 41. It may be possible to perform accurate shift range switching.

In the fourth embodiment, when the angle learning section 83 learns the rotation angle, the feedback control section 84 rotates the motor 41 slower compared with a case where the learning is not executed.

Thereby, it may be possible to surely detect the valley position when the angle learning section 83 performs the rotation angle learning.

Other Embodiments

In other embodiments, the motor is not limited to the feedback control, and may be rotationally driven by another method such as energization switching control that sequentially switches the energization phase in accordance with the rotation angle, for example.

In other embodiments, the detent plate may have two, three, five or more recesses. Together with this, the shift range switched by the shift range switching mechanism may be two, three, or five or more.

In other embodiments, the rotation angle learning by the angle learning section is not limited to be performed in the initial operation in the assembly plant or the like, and may be performed periodically thereafter. By being performed periodically, it may be possible to perform fine adjustments when the valley position changes over time. The rotation angle learning by the angle learning section may be performed not only when operating from one end of the range determination area to the other end, but also when operating in a part of the range determination area.

The present disclosure is described with the embodiments. However, the present disclosure is not limited to the embodiments and structures. That is, the present disclosure also encompasses various modifications and variations within the scope of equivalents. Furthermore, other combinations and other forms including various combinations and various forms of only one element, or more, or less, are also within the scope and spirit of the present disclosure.

The invention claimed is:

1. A shift range control apparatus applied to a shift range switching mechanism including a rotation member including a plurality of recesses, and an engagement member configured to position the rotation member by engaging to the recesses, the shift range control apparatus configured to control a motor of a shift actuator connected to the rotation member to switch a shift range, and the shift range control apparatus comprising:
a rotation speed detection section configured to detect an output shaft rotation speed corresponding to a rotation speed of an output shaft of the shift actuator; and
a movement determination section configured to determine that an engagement portion of the engagement member has relatively moved to a bottom of one of the recesses of the rotation member in response to that the output shaft rotation speed is equal to or lower than a predetermined value during switching of the shift range.

2. The shift range control apparatus according to claim 1, further comprising:
a stop control section configured to stop rotation of the motor to finish the switching of the shift range, in response to that the movement determination section determines that the engagement portion has relatively moved to the bottom of the one of the recesses in accordance with a target shift range.

3. The shift range control apparatus according to claim 1, further comprising:
an angle detection section configured to detect a rotation angle of the output shaft; and
an angle learning section configured to, in response to that the movement determination section determines that the engagement portion has relatively moved to the bottom of the one of the recesses, learn a rotation angle of the output shaft at a time of determining, as a rotation angle in response to that the engagement portion is positioned at the bottom of the one of the recesses.

4. The shift range control apparatus according to claim 3, further comprising:
a motor control section configured to, in response to that the angle learning section performs learning of the rotation angle, rotate the motor slower compared with a case where the angle learning section does not perform the corresponding learning.

* * * * *